3,138,478
METHOD OF ENCAPSULATING A PARTICULATE GAS-EVOLVING AGENT BY POLYMERIZING A MONOMER ONTO THE SURFACE OF SAID AGENT

Edward A. Hedman, Roselle, and Selwyn R. Mather, Elmhurst, Ill., assignors to The Richardson Company, Melrose Park, Ill., a corporation of Ohio
No Drawing. Filed July 18, 1960, Ser. No. 43,343
8 Claims. (Cl. 117—47)

This invention is concerned with coating gas-evolving agents and, in particular, gas-evolving or blowing agents capable of being used for the production of improved lightweight plastic cellular products.

Considerable prior art has been developed relating to the production of expandable plastics derived from gas-evolving or blowing agents and to cellular articles made therefrom. Cellular articles are generally identified by the type of cell structure formed wherein the cells are either intercommunicating, characteristic of sponge rubber, or are closed without interconnecting passages between cells. Further disclosures relating to cell structures and methods for making cellular products may be found in a number of publications, for example, Patent 2,261,459, which is primarily concerned with gas-expanded rubber, and Modern Plastics Encyclopedia, 1960 (issued September 1959), pages 285–314.

One method of making cellular products consists of initially incorporating a gas-evolving or blowing agent in a selected plastic composition by physically mixing the plastic composition and blowing agent together. The plastic composition containing the gas-evolving or blowing agent is then molded or otherwise shaped, usually in the presence of heat which activates the blowing agent liberating a gas. The liberated gas permeates the plastic causing it to swell or expand, resulting in a finally enlarged product having a multiplicity of internal voids or cells which may or may not be of the closed cell variety, depending, for example, upon process conditions, the blowing agent or the particular plastic used.

Among the numerous plastic materials which have been foamed or rendered cellular in the foregoing manner are natural and synthetic rubbers or elastomers and a wide variety of resinous or polymeric materials, for example, vinyl type polymers, alkyd resins, phenolic-aldehyde resins and the like. Blowing agents generally employed to form plastic cellular products are those which are capable of liberating such gases as nitrogen, carbon dioxide, carbon monoxide or mixtures thereof. Most blowing agents are activated by either a chemical reaction, heat or a combination of the two. Many blowing agents are available which can be activated within predeterminable temperature ranges, thereby permitting their use with plastic compositions under controlled conditions.

While physically mixing the blowing agent and plastic has been widely adopted, such a process presents certain difficulties, particularly with sensitive blowing agents or blowing agents which can be activated at relatively low temperatures. The majority of plastics, e.g. rubbers and resins, require working, normally at elevated temperatures, to properly incorporate other components including blowing agents and, hence, careful control must be exercised in order to incorporate such blowing agents in plastic materials. Further, it is difficult to achieve thorough dispersion of a blowing agent within a plastic composition by physical mixing whereby the final blown product will have a homogeneous cell structure.

Accordingly, the present invention has as one of its principal objects a new method of incorporating a blowing agent into a plastic material.

Another object is the provision of new and improved expandable plastic compositions capable of being used in the formation of cellular products.

A further object is to provide cellular articles having enhanced properties due, in part, to a more uniform and controlled distribution of cells.

A still further object is the provision of a new process for coating a particulate gas-evolving agent with a polymer.

These and other objects, which will become more apparent from the specification hereinafter, are achieved by coating or encapsulating gas-evolving or blowing agent particles with a desired polymeric composition formed in situ. Techniques for coating or encapsulating certain inert fillers are disclosed in the U.S. patent to Iler et al., 2,876,133, assigned to Du Pont, and in Belgium Patents 575,559 and 578,868, assigned to National Lead Company. More particularly, these patents propose that cellulose fibers, carbon black and similar particulate material may be coated with various polymerized compounds. The present invention contemplates the use of somewhat similar techniques in making the new improved expandable plastic compositions by individually coating the blowing agent particles, thereby achieving a more intimate dispersion of blowing agent in the plastic without the aforementioned disadvantages and obtaining improved homogeneity of cell formation in a product made from such compositions.

In brief, the process of the present invention consists of initially coating the surface of gas-evolving or blowing agent particles with a polymerization catalyst and subsequently mixing the catalyst-treated particles with a polymerizable monomer, whereby the monomer is polymerized in situ on the surface of the blowing agent particles. Many monomeric compounds may be polymerized or copolymerized by catalysts in situ on the particles and, particularly, ethylene unsaturated monomers characterized by the presence of the ethylene group $>C=C<$ and polymerizable by an addition reaction.

One class of catalyst which has been found especially appropriate in connection with the present invention is the Ziegler-type catalyst described in the above Belgium patents and in the publication "Linear and Stereoregular Addition Polymers," Gaylord and Mark, 1959. Catalysts of this type are the reaction complexes resulting from the combination of, for example, organoaluminum compounds and titanium halides, particularly triethylaluminum and titanium tetrachloride. More broadly, such catalysts are complexes derived from salts of transition metals, for example, the alkoxides or halides of zirconium, iron, chromium and titanium, with organometallic compounds exemplified by butyllithium, amylsodium and triethylaluminum.

In the presently preferred process, gas-evolving or blowing agent particles are initially suspended in an inert vehicle, such as toluene or benzene, followed by introducing the catalyst in appropriate sequence of steps to obtain proper adherence to or deposition on the surface of the gas-evolving or blowing agent particles. With the usual Ziegler type of catalyst, for example, titanium tetrachloride and triethylaluminum, the titanium halide is generally added to a suspension of blowing agent initially followed by the addition of the triethylaluminum, although the order may, in some instances, be reversed. Blowing agents which are presently preferred when using a Ziegler-type catalyst are those which are nitrogenous and which contain an active hydrogen. It is believed that the presence of the active hydrogen enables the titanium halide to chemically react with the blowing agent and thereby improve the adherence of the catalyst to the blowing agent. Subsequent addition of the organoaluminum compound permits the formation of the catalyst complex in situ on the surface of the blowing agent.

After the catalyst has been formed on or applied to the surface of the blowing agent, as described above, for example, the desired polymerizable monomer is then introduced into the blowing agent suspension. With catalysts of the Ziegler type, polymerization normally begins immediately, as evidenced by an increase in viscosity of the suspension, due apparently to separation of blowing agent polymer particles. After the desired degree of coating or encapsulation has been obtained, the catalyst is deactivated and the viscous mass dried, leaving a powdery product consisting of particles of blowing agent coated or encapsulated with polymer.

A blowing agent employed to form plastic cellular products is usually selected on the basis of the temperature range within which it can be activated, which, in turn, is generally based on the temperature required to mold or form a given plastic material selected for a particular product. For example, if a plastic from which a product is to be formed requires a fluidizing temperature of 200° F. to enable it to flow sufficiently to fill all parts of a mold cavity, then a blowing agent would normally be selected which can only be activated at a temperature in excess of 200° F., but usually not more than about 50° F., e.g., 250° F. It will, of course, be appreciated that all temperatures which may be involved in coating blowing agents or subsequently compounding the resulting plastic composition with other components prior to molding must necessarily be below those temperatures at which the blowing agent is activated in order to avoid premature release of cell-forming gas.

Exemplary blowing agents which may be used are listed in Table I of the above mentioned 1960 Modern Plastics Encyclopedia, page 310, examples of which are: $\alpha,\alpha'$-azobis(isobutyronitrile), 1,1'-azobis(formamide), diazoaminobenzene and benzene sulfonylhydrazide. As indicated above, numerous factors and end use will govern the selection of a particular gas-evolving or blowing agent, for example, temperature of activation and rate of decomposition, effect of other components of a composition on the decomposition characteristics of agent, effect of the agent and its decomposition products on the principal binder and processing conditions.

Particulate gas-evolving or blowing agents may be coated with a wide variety of monomeric compounds, which can be polymerized by a catalyst initially deposited on the surface of the agent particles and, particularly, monomers characterized by the presence of ethylene unsaturation and polymerizable by addition reactions. Illustrative of such monomeric compounds are ethylene; isoprene; 2-chlorobutadiene; styrene; acrylic acids, esters and nitriles, such as acrylonitrile, methyl methacrylate and methoxymethyl methacrylate; vinyl halides, such as vinyl chloride and vinylidene fluoride; vinylcarboxylates, like vinyl acetate and similar compounds, as indicated, for example, in the aforementioned Belgium and Iler patents cited hereinabove.

A variety of catalytic systems may be employed, depending on the particular monomeric compounds and gas-evolving blowing agent contemplated. Thus, the free radical-generating addition polymerization initiators disclosed in the Iler patent may be used as well as cationic or anionic type catalyst systems. Catalysts of the Ziegler type are generally considered to be anionic addition polymerization initiators.

Where the properties of an end product require or permit, various fillers may be incorporated with the encapsulated blowing agents made in accordance with the present invention. For example, particulate fillers may be coated simultaneously with the blowing agent or, alternately, may be coated separately and then mixed with the coated blowing agent to obtain a composite composition. A variety of fillers may be similarly coated to form composite compositions including fillers cited in the Iler patent. Typical fillers which may be, likewise, coated or encapsulated are: carbon black, silica, titania and fibrous materials, exemplified by wood or cotton cellulosic fibers. Blowing agent particles and filler particles, when used, ranging in size from one millionth mm. to 1.0 mm. may be coated in accordance with the present invention.

As further illustrating the invention, but without intending thereby to limit the same, the following examples are presented of blowing agent encapsulation and formation of closed cell structures from such agents.

*Example I*

To 1400 ml. of toluene in a reaction flask at room temperature was added 2.5 grams of 1,1'-azobis(formamide) sold by Naugatuck Chemicals Company as Celogen-AZ. The dissolved oxygen content of the system was lowered by evacuation of the apparatus to 10 mm. pressure three times, followed each time by introduction of pre-purified nitrogen. 2.0 ml. of titanium tetrachloride (0.02 mole) were added, followed in five minutes by adding 2.7 ml. (0.02 mole) of triethylaluminum, whereupon the yellow suspension became dark brown and the temperature rose 2° C. After fifteen minutes, ethylene gas was passed into the rapidly stirred suspension at the rate of 1000 cc./min. After twenty-seven minutes, the temperature had risen from 24° to 32° C. and polymer particles were seen to form on the vessel walls. The temperature rose to a maximum of 64.5° in two hours then dropped slowly to 54° after a total of 3⅓ hours. The brown suspension was so viscous at this time that stirring was discontinued and, after the addition of 50 ml. of methanol to decompose the catalyst, the creamy precipitate was removed by filtration. There was obtained 104 grams of waxy powder after vacuum drying.

The powder, when heated in air on a variable temperature metal block, became rubbery at 160° C. and, at 205° C., the plastic mass filled with gas from decomposition of the blowing agent. When the mass was cooled to room temperature, it had expanded to twice its original volume and contained many small unconnected cells.

A cup molded in the Erie flow tester at 365° F. weighed 18 grams in comparison in a non-blown polyethylene cup of the same volume which weighed 31 grams, indicating a density of approximately 0.6 g./cc. for the cellular material.

*Example II*

2.5 grams of National Polychemicals, Inc., Kempore R–125 blowing agent 1,1'-azobis(formamide) were suspended in 900 ml. of benzene. The catalyst was formed on the surface of the blowing agent as in Example I, except that the amount of $TiCl_4$ was reduced to 1.0 ml. (0.01 mole), giving an Al/Ti ratio of 2. Seventeen minutes after addition of triethylaluminum, 54 grams of distilled and dried styrene monomer were added, then the finely divided brown suspension reaction mixture was heated to 65–70° C. for eighteen hours during which time a heavy tan solid precipitated. After cooling, adding methanol and filtration, there was obtained 10 grams (18.5% yield) of a high melting tan solid. This material was heated under crossed Polaroids on a Koffler hot stage and appeared to be isotactic because of its high melting point. At 210°, it was crystalline becoming non-crystalline at 235° and filling with gas at 245° as the blowing agent decomposed. The cooled piece was full of small cells at room temperature and floated in pentane indicating that it has a bulk density below about 0.63 g./cc. as contrasted with non-foamed polystyrene having a density of the order of 1.06 g./cc.

Addition of an equal volume of methanol to the filtered reaction mixture causes an additional 3 grams of (5.5%) benzene-soluble, presumably atactic, polystyrene to precipitate. This fraction which melted completely in the range of 80–116° C. did not blow when heated indicating that soluble fractions are not encapsulates.

Example III

In 1400 ml. of toluene was suspended 3.0 grams of Celogen, p,p'-oxy-bisbenzenesulfonylhydrazide (Naugatuck Chemicals). After coating the blowing agent particles with the catalyst and in the manner of Example I, butadiene gas at 600 cc./min. was passed into the suspension while agitated. The temperature rose from 23° to 39° in two hours and fell to 31° after four hours. The brown precipitate turned creamy after treatment with 100 ml. of methanol and after filtration and vacuum drying weighed 25 grams. The yellowish, tough, rubbery polymer when heated on an electric block softened at 155° C., flowed readily at 185° and filled with bubbles at 220° C. A foamed cup molded from the material at 265° in the Erie flow tester weighed 15 grams, but in contrast with foamed polyethylene was rubbery instead of rigid.

Various amounts of polymeric materials may be applied to the surface of gas-evolving or blowing agent particles ranging from as little as .001% to 1000% based on the weight of the particle. Preferably, the gas-evolving or blowing agents are coated or encapsulated with polymer to the extent that the agent comprises between about 1 to 15 percent by weight of the total weight of polymer and agent.

Particulate blowing agents coated with polymeric materials, as contemplated herein, may be combined or compounded with a variety of fillers, which may also be coated, as indicated above, as well as coloring agents, vulcanizing agents and similar components commonly forming a part of molding, coating or analogous compositions. Additional polymeric or resinous materials may also be blended with the coated blowing agent to obtain composite compositions.

Encapsulating or coating gas-evolving or blowing agents in accordance with the present invention affords the advantages of incorporating such agents in plastic compositions under less stringent conditions as compared to prior practices of physical mixing. In addition, this technique frequently will enable the resulting plastic composition containing encapsulated gas-evolving or blowing agents to be worked and molded or shaped at lower temperatures and also permits the use of agents which may be activated at lower temperatures.

Having described certain exemplary embodiments of the invention, the same is intended to be limited only by the scope of the following claims.

We claim:

1. A process of making a moldable composition capable of forming shaped cellular articles which comprises initially applying a polymerization catalyst to the surface of a particulate blowing agent and subsequently encapsulating the blowing agent particles with a polymer by contacting the particles with a monomer capable of being polymerized by said catalyst.

2. A process for coating a particulate compound capable of evolving a gas at a predetermined temperature level with a polymeric material which comprises suspending particles of said compound in an inert solvent, affixing a polymerization catalyst to the surfaces of said particles and encapsulating the particles of said compound with a polymer by contacting said particles with a monomer polymerizable by said catalyst.

3. A process as described in claim 2 wherein the catalyst is the reaction complex of an organo aluminum compound and a titanium halide.

4. A process as described in claim 3 wherein the catalyst is the reaction complex of titanium tetrachloride and triethylaluminum.

5. A process as described in claim 4 wherein the monomer is ethylenically unsaturated.

6. A process as described in claim 5 wherein the monomer is ethylene.

7. A process as described in claim 5 wherein the monomer is styrene.

8. A process as described in claim 5 wherein the monomer is butadiene.

References Cited in the file of this patent

UNITED STATES PATENTS

| | | |
|---|---|---|
| 2,891,017 | Kern et al. | June 16, 1959 |
| 2,945,827 | Henning | July 9, 1960 |